No. 616,151. Patented Dec. 20, 1898.
J. F. SIMONS.
THIMBLE GAGE.
(Application filed Nov. 16, 1897.)
(No Model.)

WITNESSES:

INVENTOR:
John F. Simons
By his atty

UNITED STATES PATENT OFFICE.

JOHN F. SIMONS, OF PHILADELPHIA, PENNSYLVANIA, ASSIGNOR TO HIMSELF, FREDERIC M. SIMONS, OF SWARTHMORE, PENNSYLVANIA, EDWARD S. SIMONS, OF ORANGE, NEW JERSEY, AND THOMAS MADDOCK, OF PHILADELPHIA, PENNSYLVANIA.

THIMBLE-GAGE.

SPECIFICATION forming part of Letters Patent No. 616,151, dated December 20, 1898.

Application filed November 16, 1897. Serial No. 658,673. (No model.)

*To all whom it may concern:*

Be it known that I, JOHN F. SIMONS, of the city and county of Philadelphia, State of Pennsylvania, have invented an Improvement in Thimble-Gages, of which the following is a specification.

My invention relates to thimble-gages; and it consists of the improvements which are hereinafter fully described and claimed and which are shown in the accompanying drawings.

It is the object of my invention to provide a simple, convenient, and accurate gage to ascertain the size of thimble required to properly fit the finger of the wearer, and thus to render trying on of thimbles unnecessary and enable a purchaser to ascertain the size required and order accordingly.

I shall now refer to the accompanying drawings, in which—

Figure 1:
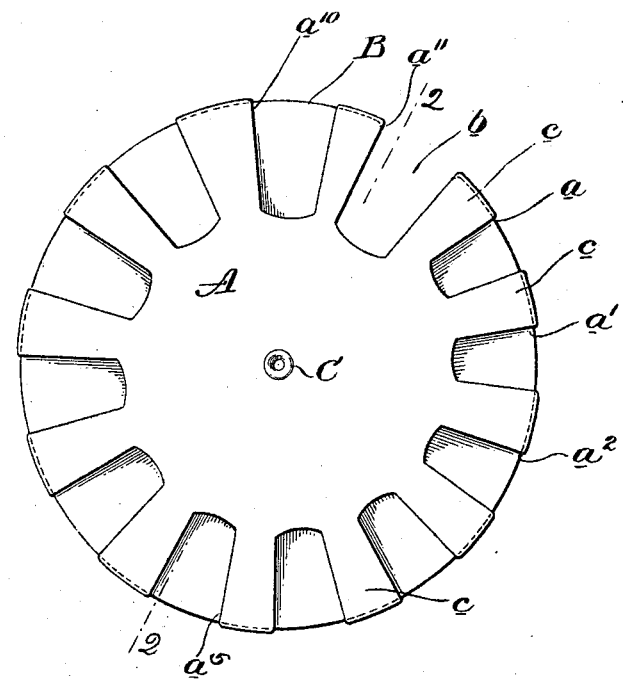
Figure 2:
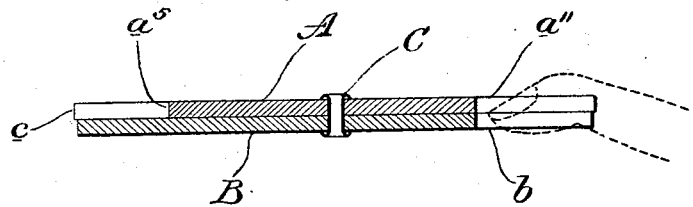

Figure 1 is a plan view of a thimble-gage embodying my invention, and Fig. 2 is a transverse sectional view of the same on the line 2 2 of Fig. 1.

A is a piece of any suitable material—such, e. g., as cardboard, celluloid, rubber, or metal—provided upon its edge with a series of recesses or notches $a$ $a'$ $a^2$, &c., corresponding in size with the internal dimensions of the thimbles.

I have shown the piece A consisting of a thin circular disk having the notches $a$ formed in its outer edge, and each notch corresponding in size with the internal dimension of a thimble. The notches $a$ are of different sizes, corresponding with the different sizes of the thimbles, and for greater convenience are preferably arranged in regular order, from the smallest to the largest, as shown.

The thimble-finger (see dotted lines in Fig. 2) is inserted in one or more of the notches until the proper fit is obtained, and the thimble of corresponding size is the one required.

To enable the thimbles to be properly identified by the gage-notches the notches are preferably marked with the sizes of the corresponding thimbles.

B is a guard-piece. This I have shown corresponding in shape with the disk A, to which it is pivotally connected at its center, as at C, so that the disk A may be turned upon the piece B on its pivot. The disk or piece B is provided upon its edge with a notch $b$ of a size substantially equal to or not less than that of the largest gage-notch in the piece $a$ and is so located that the piece A may be turned or moved to bring any one of the notches $a$ opposite this notch $b$, as shown in Fig. 2. The disk B thus acts to close all of the notches $a$ except the one which is being used and serves as a protection or guard for the notched edge of the disk A and to prevent the tongues $c$ between the notches $a$ from being broken. The face of the guard-piece B may be provided with illustrations showing the designs of the thimbles, which will be exposed through the notches $a$, thus enabling the purchaser to select the style of thimble desired.

The details of construction shown may be varied without departing from the invention.

What I claim as new, and desire to secure by Letters Patent, is—

1. A thimble-gage consisting of a piece of suitable material provided with a series of recesses or notches of different sizes corresponding with the internal dimensions of a series of thimbles, and a notched guard-piece connected with the gage-piece and extending over and closing the gage-notches thereof, but movable with reference thereto to bring its notch into register with and open any one of said notches.

2. A thimble-gage composed of the disk A provided with a series of notches $a$, $a'$, &c., upon its circumference, and the guard B pivotally connected with the disk A and extending over and closing the notches thereof, but having a notch $b$ in its circumference adapted to be brought into register with any desired notch of the series $a$ $a'$, &c.

In testimony of which invention I hereunto set my hand.

JOHN F. SIMONS.

Witnesses:
ARTHUR BOSWELL,
WM. W. EVANS.